(12) United States Patent
Bunyer et al.

(10) Patent No.: US 10,144,472 B2
(45) Date of Patent: Dec. 4, 2018

(54) ADJUSTABLE ACCESSORY MOUNT

(71) Applicant: Harley-Davidson Motor Company Group, LLC, Milwaukee, WI (US)

(72) Inventors: Michael Bunyer, Menomonee Falls, WI (US); Scott Hein, Plymouth, WI (US); Fred Knoch, Racine, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 698 days.

(21) Appl. No.: 14/600,335

(22) Filed: Jan. 20, 2015

(65) Prior Publication Data
US 2015/0203165 A1 Jul. 23, 2015

Related U.S. Application Data

(60) Provisional application No. 61/929,388, filed on Jan. 20, 2014.

(51) Int. Cl.
*B62J 7/04* (2006.01)
*B62K 11/04* (2006.01)

(52) U.S. Cl.
CPC ............. *B62J 7/04* (2013.01); *B62K 11/04* (2013.01)

(58) Field of Classification Search
CPC .................................. B62J 7/04; B62K 11/04
USPC ........................................................ 224/413
See application file for complete search history.

(56) References Cited

U.S. PATENT DOCUMENTS

| 4,993,731 | A | * | 2/1991 | Fuller | B62J 1/28 280/202 |
| 5,558,260 | A |   | 9/1996 | Reichert | |
| 5,664,715 | A | * | 9/1997 | Gogan | B62J 7/04 224/413 |
| 5,667,232 | A | * | 9/1997 | Gogan | B62J 1/28 280/202 |
| 6,053,384 | A | * | 4/2000 | Bachman | B62J 7/04 224/413 |
| 6,347,804 | B1 | * | 2/2002 | Seibel | B62J 1/28 180/219 |
| 6,443,344 | B1 | * | 9/2002 | Nicosia | B62J 1/28 224/413 |
| D464,254 | S |   | 10/2002 | Monson | |

(Continued)

FOREIGN PATENT DOCUMENTS

WO 96/33055 10/1996
WO 00/15487 3/2000

*Primary Examiner* — Nathan J Newhouse
*Assistant Examiner* — Lester L Vanterpool
(74) *Attorney, Agent, or Firm* — Michael Best & Friedrich LLP

(57) ABSTRACT

A motorcycle includes a frame, a rear fender coupled to a rear portion of the frame, an accessory support structure and a pair of docking structures. The frame defines a longitudinal center axis, the motorcycle having left and right sides divided by the longitudinal axis. The accessory support structure is positioned laterally adjacent to both left and right sides of the rear fender. The pair of docking structures each includes a lug secured to the frame and extending transverse to the longitudinal center axis, and a hollow fitting positionable on the lug in a plurality of different rotational orientations about a mutual axis of the lug and the fitting. The fitting defines a docking surface with a non-circular cross-section. Lateral offset of the docking surface may be adjustable by reversing the fitting on the lug.

20 Claims, 7 Drawing Sheets

(56) References Cited

U.S. PATENT DOCUMENTS

| | | |
|---|---|---|
| D465,148 S | 11/2002 | Monson |
| D466,001 S | 11/2002 | Monson |
| D469,006 S | 1/2003 | Monson |
| 6,729,515 B2 | 5/2004 | Nicosia et al. |
| 6,782,597 B1 | 8/2004 | Monson |
| 6,811,365 B2 | 11/2004 | Monson |
| 6,820,782 B1 | 11/2004 | Monson |
| 6,830,169 B1 | 12/2004 | Campbell |
| 6,840,704 B1 | 1/2005 | Monson |
| 7,150,382 B2 | 12/2006 | Zickefoose |
| 7,654,496 B2 * | 2/2010 | Sharpe .................. B62J 1/28 224/413 |
| 7,946,632 B1 | 5/2011 | Mueller |
| 8,172,188 B2 | 5/2012 | Dubinskiy et al. |
| 2002/0079730 A1 * | 6/2002 | Schuhmacher ........ B60N 2/015 297/378.1 |
| 2003/0122002 A1 | 7/2003 | Monson |
| 2004/0104255 A1 * | 6/2004 | Trautman ................ B62J 11/00 224/413 |
| 2005/0150921 A1 | 7/2005 | Schneider |
| 2013/0133170 A1 | 5/2013 | Dubinskiy et al. |
| 2015/0203165 A1 * | 7/2015 | Bunyer .................. B62J 7/04 224/413 |

\* cited by examiner

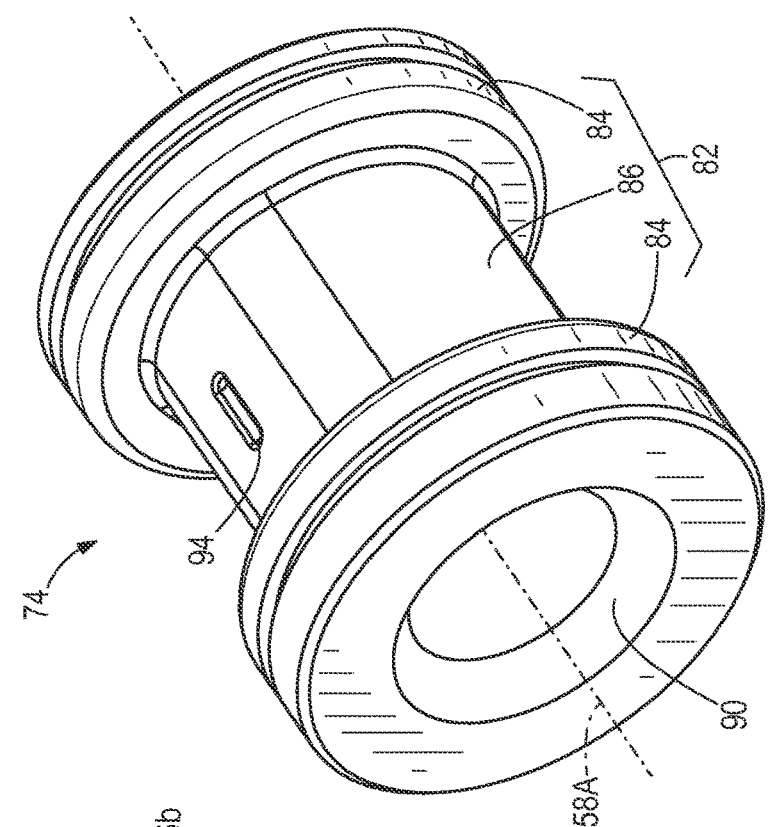
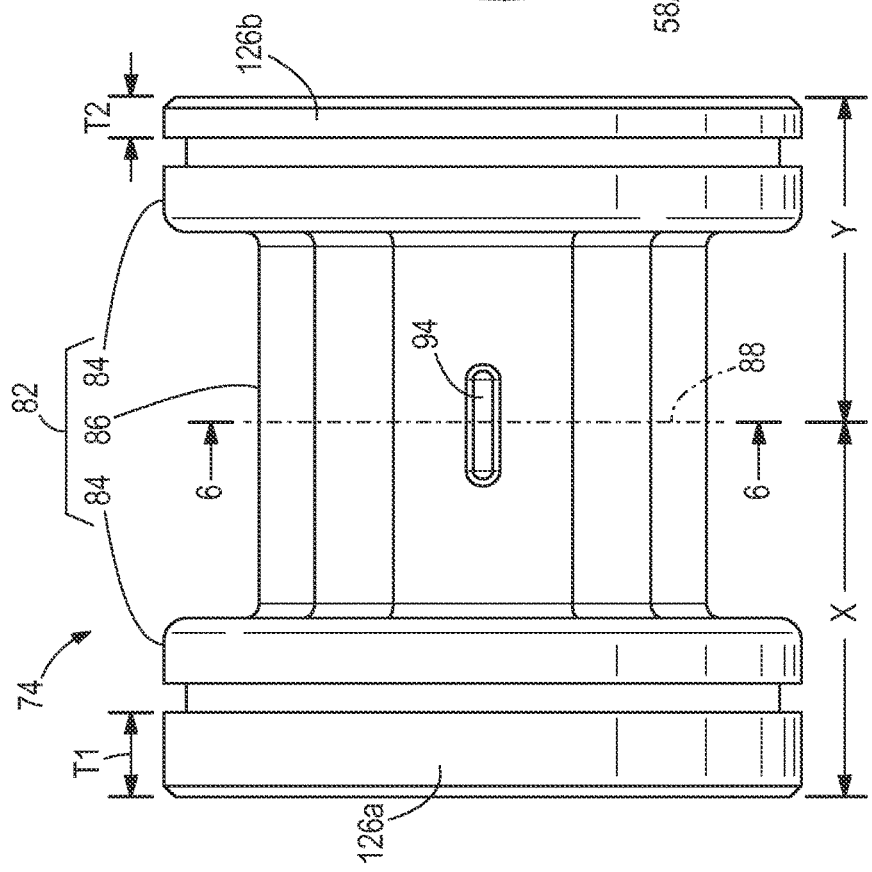

ADJUSTABLE ACCESSORY MOUNT

CROSS-REFERENCE TO RELATED APPLICATIONS

The present application claims priority to U.S. Provisional Patent Application No. 61/929,388, filed Jan. 20, 2014, the contents of which are hereby incorporated by reference.

BACKGROUND

Motorcycles and other personal vehicles often have detachable storage racks, uprights and other accessories that are detachable from the motorcycle. Mounting the accessories is typically done using simple, fixed mounting brackets or docking points provided on the motorcycle to enable quickly and easily detaching the accessories from the motorcycle.

SUMMARY

The present invention provides, in one aspect, a motorcycle that includes a frame defining a longitudinal center axis, the motorcycle has left and right sides divided by the longitudinal center axis. The motorcycle further includes a rear fender coupled to a rear portion of the frame, an accessory support structure positioned laterally adjacent to both left and right sides of the rear fender and a pair of docking structures. The pair of docking structures includes a left docking structure positioned on the left side of the longitudinal center axis, and a right docking structure positioned on the right side of the longitudinal center axis. Each of the pair of docking structures includes a lug that is secured to the frame and that extends transverse to the longitudinal center axis, and a hollow fitting positionable on the lug in a plurality of different rotational orientations about a mutual axis of the lug and the fitting. The fitting defines a docking surface with a non-circular cross-section.

The present invention provides, in another aspect, a motorcycle that includes a frame defining a longitudinal center axis, the motorcycle having left and right sides divided by the longitudinal center axis. The motorcycle further includes a rear fender coupled to a rear portion of the frame, an accessory support structure positioned laterally adjacent to both left and right sides of the rear fender and a pair of docking structures. The pair of docking structures includes a left docking structure positioned on the left side of the longitudinal center axis, and a right docking structure positioned on the right side of the longitudinal center axis. Each of the pair of docking structures includes a lug that is secured to the frame and that extends transverse to the longitudinal center axis, and a hollow fitting positionable on the lug. The fitting has a first end defining a first flange, a second end defining a second flange, and a docking surface between the first and second ends. The fitting is removable from the lug and repositionable so that either the first flange or the second flange engages the accessory support structure. In at least one of the pair of docking structures, the first flange has a first thickness and the second flange has a different, second thickness so that a lateral dimension from the longitudinal center axis to a center of the docking surface is adjusted depending on which of the first and second flanges is engaged with the accessory support structure.

The present invention provides, in another aspect, an accessory support assembly for a motorcycle, the accessory support assembly includes an accessory support structure configured for attachment to the motorcycle and that is bisected by a longitudinal center axis to define left and right portions, a pair of docking structures. The pair of docking structures includes a left docking structure coupled to the left portion of the accessory support structure, and a right docking structure coupled to the right portion of the accessory support structure. Each of the pair of docking structures includes a lug that is secured to the frame and that extends transverse to the longitudinal center axis, and a hollow fitting positionable on the lug in a plurality of different rotational orientations about a mutual axis of the lug and the fitting. The fitting has a first end, a second end, and a docking surface between the first and second ends. An outer surface of the docking surface is provided with a non-circular cross-section. A lateral dimension from the longitudinal center axis to a center of the docking surface is adjusted depending on which of the first and second ends of the fitting faces toward the longitudinal center axis when positioned on the lug.

Other features and aspects of the invention will become apparent by consideration of the detailed description and accompanying drawings.

BRIEF DESCRIPTION OF THE DRAWINGS

FIG. 4 is an enlarged perspective view of a fitting of the docking points of the motorcycle of FIG. 1.

FIG. 5 is a side view of the fitting of FIG. 4.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
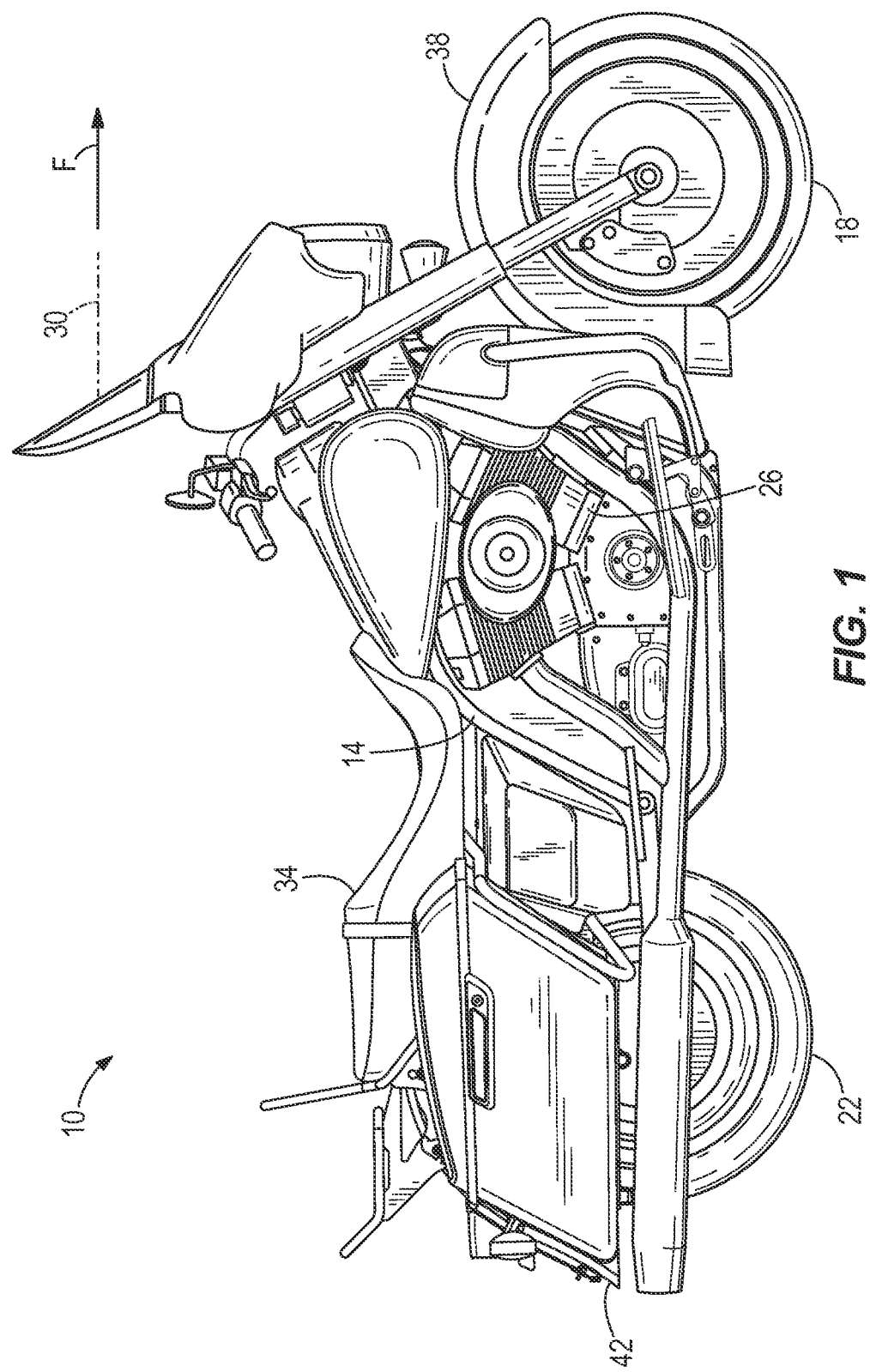
FIG. 1 is a side view of a motorcycle provided with detachable accessories.

FIG. 1 illustrates a motorcycle 10 that includes a frame 14, a front wheel 18, and at least one rear wheel 22 and a longitudinal center axis 30 that divides the motorcycle into left and right sides. An engine 26 is configured to drive the at least one rear wheel 22 in a forward direction of travel F along the longitudinal center axis 30 of the motorcycle 10.

A seat 34 is provided that is coupled to the frame 14 between the front wheel 18 and the at least one rear wheel 22 and positioned generally above the engine 26. A front fender 38 and a rear fender 42 are provided as body panels.

Figure 2:
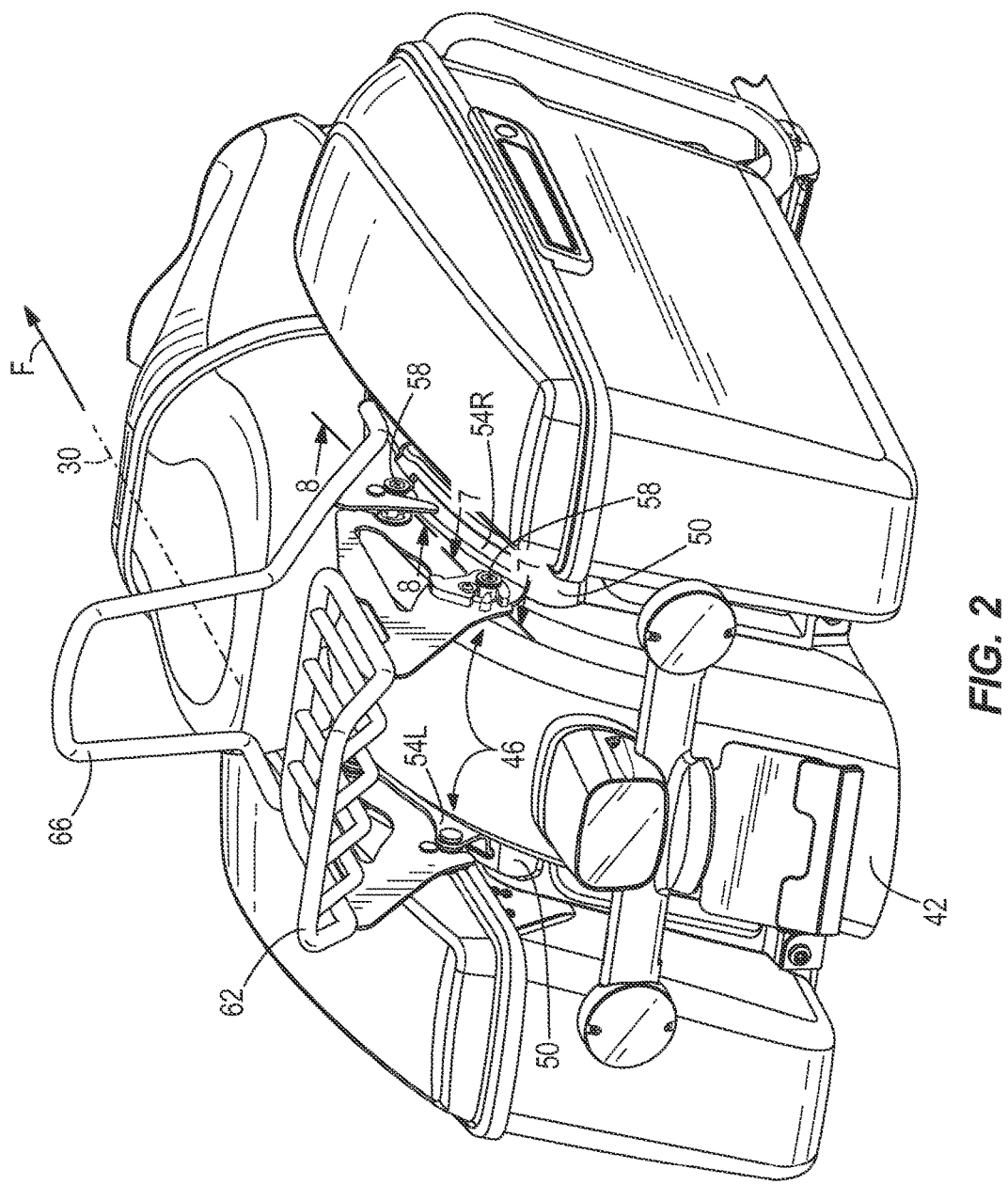
FIG. 2 is a perspective view of a rear portion of the motorcycle of FIG. 1 illustrating the detachable accessories as a rack and an upright rail secured to docking points.

Referring to FIG. 2 the motorcycle 10 also includes an accessory support assembly 46 having a center axis coaxial with the axis 30 of the motorcycle 10. The accessory support assembly 46 includes a pair of left and right fender struts 50 that are provided at a rearward extent of the frame 14 and coupled to the rear fender 42 at opposing, laterally outward sides of the rear fender 42. The accessory support assembly 46 also includes left and right mounting brackets 54L, 54R positioned on corresponding sides of the rear fender 42 and extending through the corresponding left and right fender struts 50. In the illustrated embodiment, the mounting brackets 54L, 54R are coupled to the frame 42, although in alternate embodiments the mounting brackets 54L, 54R may be coupled to the fender struts 50 or directly to the rear fender 42. The accessory support assembly 46 also includes multiple adjustable accessory mounts, referred to herein as docking structures or docking points 58 that extend transversely to the longitudinal axis 30 of the motorcycle 10 along respective longitudinal docking point axes 58A for supporting at least one detachable accessory. In the illustrated embodiment, multiple detachable accessories are shown, including a rack 62 having a support surface for cargo or luggage, and an upright rail 66. The rack 62 includes latches 64 configured to secure the rack 62 to a pair of rearward docking points 58 and a pair of front mounting slots 62a (FIG. 3) each configured to slidingly receive one of the forward docking points (not shown). Similarly, the upright rail 66 includes latches 68 configured to secure the upright rail 66 to a pair of forward docking points 58 and a pair of front mounting slots 66a (FIG. 3) each configured to slidingly receive a fixed docking point (not shown).

Figure 3:
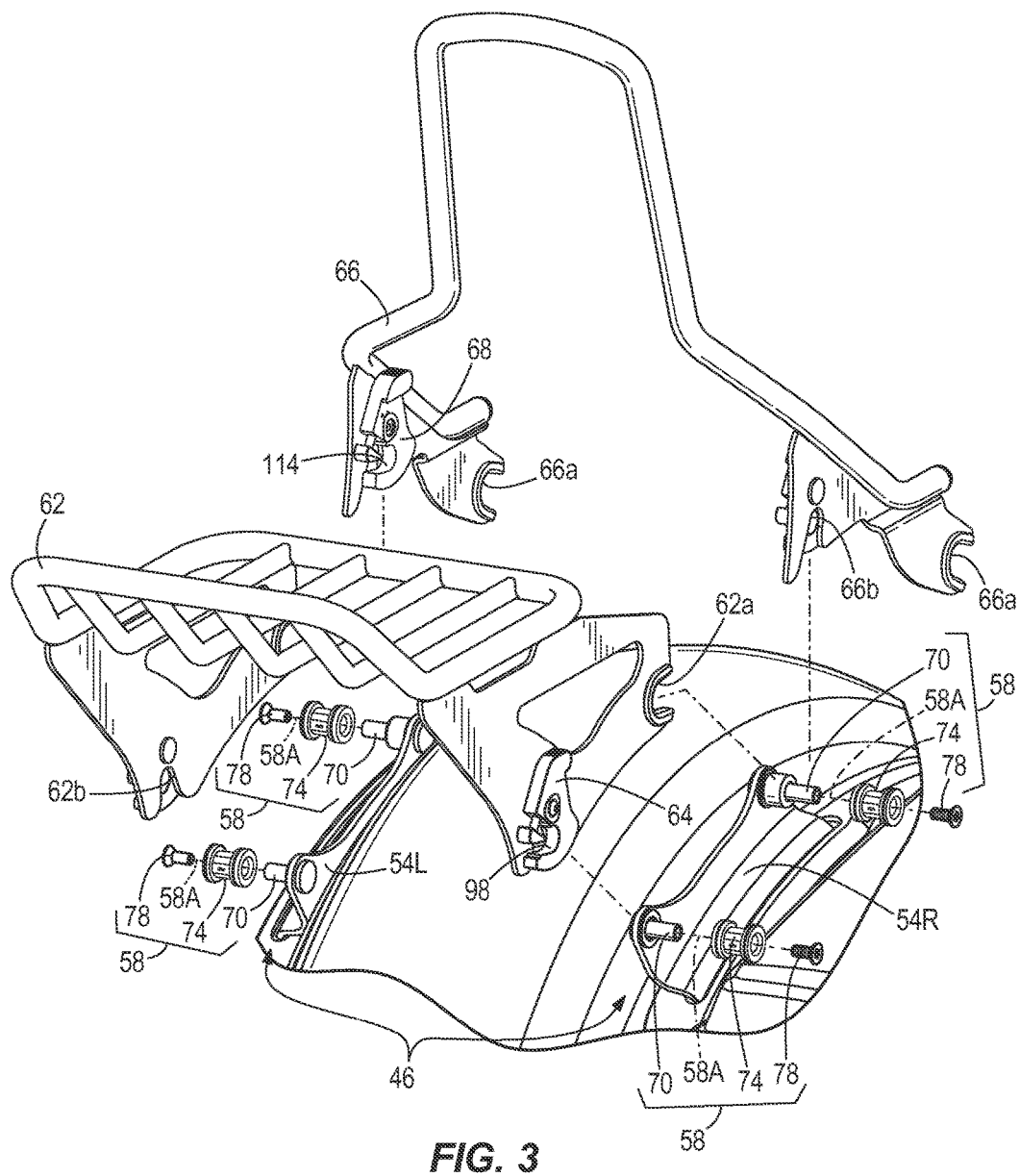
FIG. 3 is an exploded perspective view of the rear portion, docking points and detachable accessories of the motorcycle of FIG. 1.

Referring to FIG. 3, the docking points 58 are arranged such that one forward and one rear docking point 58 are positioned on each side of the frame 14 and extend outwardly from the corresponding left and right mounting brackets 54L, 54R. Each of the docking points 58 on the left mounting bracket 54L is arranged to be substantially coaxial with the corresponding docking point 58 on the right mounting bracket 54R so that the arrangement of docking points 58 on the left and right mounting brackets 54L, 54R mirror one another. In alternative embodiments, there may be any number of forward and rear docking points 58.

Figure 6:
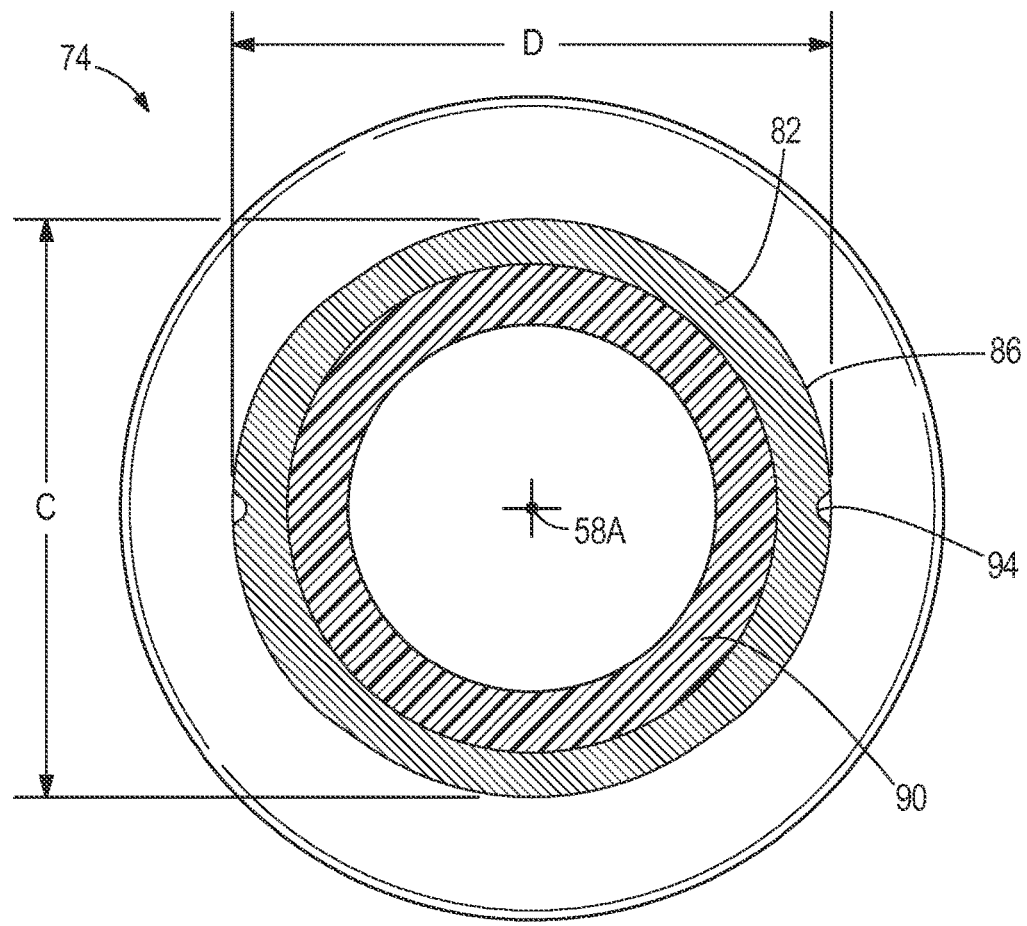
FIG. 6 is a cross-sectional view of the fitting of FIG. 4 taken along 6-6 of FIG. 5.

With continued reference to FIG. 3, each docking point 58 is a multi-piece assembly including a lug 70 protruding laterally from the respective mounting bracket 54L, 54R and a fitting 74 that is removably secured to the lug 70 by a fastener 78 (e.g., a screw). In alternate embodiments, there may be separate mounting brackets for each docking point 58 or a single mounting bracket that all docking points 58 protrude from. Alternatively, in other embodiments the lug 70 may instead protrude from the rear fender 42. As shown in FIGS. 4-6, each fitting 74 includes an outer sleeve 82 and a bushing 90 positioned within the sleeve 82. The outer sleeve 82 defines a flange 84 at each end. The outer sleeve 82 also defines a docking surface 86 located between the end flanges 84 having a width (measured along the axis 58A) for mounting the rack and 62 and the upright rail 66. A center plane 88 equidistant between the end flanges 84 bisects the width of the docking surface 86. In one embodiment, the bushing 90 is constructed of steel and the sleeve 82 is constructed of a polymeric material such as plastic or an elastomer. The material forming the sleeve 82 may be overmolded onto the bushing 90. As shown in FIG. 6, the docking surface 86 has an elliptical cross-section such that a first dimension D measured perpendicular to the axis 58A is larger than a second dimension C measured perpendicular to both the axis 58A and the first dimension D. As shown, the first dimension D defines a maximum diameter and the second dimension C defines a minimum diameter. An indicator 94 (e.g., a notch) is positioned on the docking surface 86 to indicate each point that is farthest from an axis of the sleeve 82, which is shared with the axis 58A of the docking point 58 (FIGS. 4-6). The fitting 74 can be rotated or otherwise repositioned on the lug 70 to provide a first type of adjustment to ensure a tight, secure fit between the docking points 58 and the detachable accessories. It will be understood that the cross-section of the docking surface 86 can have other non-circular shapes besides elliptical as shown to provide adjustment of fit or tightness, for example in a discontinuous manner with discrete stages or steps.

In addition, the bushing 90 of each fitting 74 defines two opposed mounting surfaces or end flanges 126a, 126b, positioned outside of the end flanges 84 of the outer sleeve 82. One of the end flanges 126a, 126b abuts or engages the corresponding mounting bracket 54L, 54R. Alternatively, the flanges 126a, 126b may abut or engage an outer surface of the rear fender 42. Each fitting 74 can be removed from the lug 70, axially reversed and repositioned on the lug 70 to provide a second type of adjustment to ensure proper position in a direction transverse to the longitudinal axis 30 of the motorcycle 10.

Figure 7:
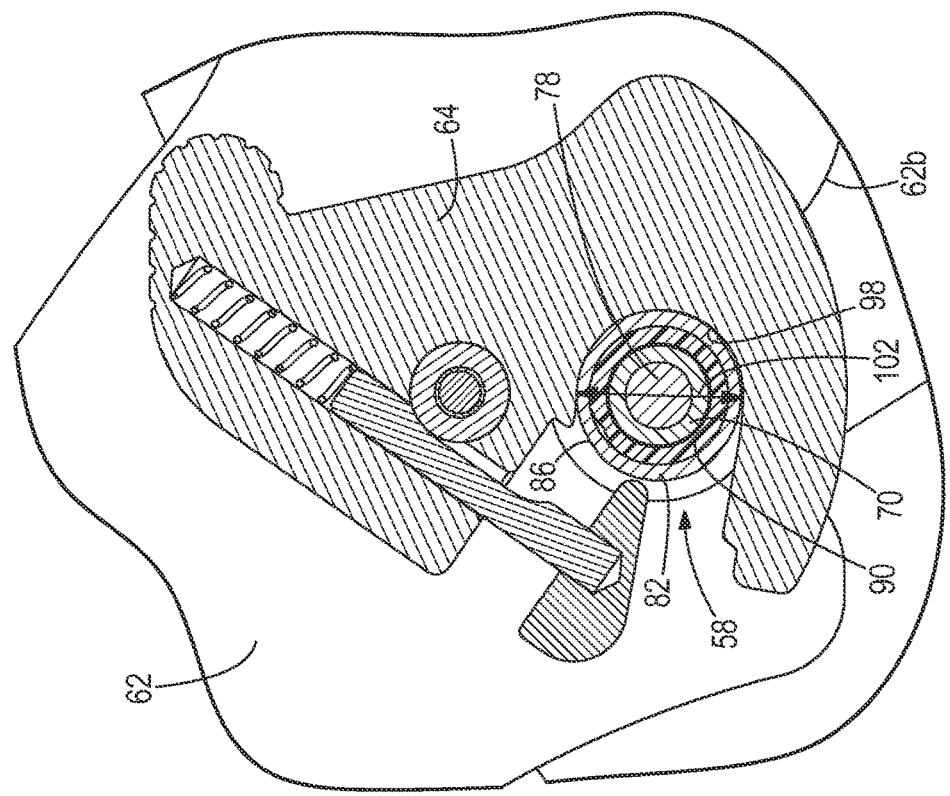
FIG. 7 is a cross-sectional view of a rear docking point taken along line 7-7 of FIG. 2, illustrating a rear mounting slot and a latch of the rack receiving the fitting of the rear docking point.

In the illustrated embodiment of FIGS. 3, and 7, the rack 62 and the upright rail 66 are releasably mounted to the accessory support assembly 46. In the illustrated embodiment, each of the front mounting slots 62a slidingly receives a portion of the lug 70 of one of the forward docking points 58. In other embodiments, each of the front mounting slots 62a may slidingly receive the fitting 74 or lug 70 of a pair of additional docking points 58 independent of the forward docking points 58. The rack 62 further includes a pair of rear mounting slots 62b that each slidingly receives the docking surface 86 of the fitting 74 between the end flanges 84 of each of the rear docking points 58. Each of the rear mounting slots 62b is configured with one of the latches 64 so that once the rear mounting slots 62b slidingly receive the fittings 74 the latches 64 are pivoted into engagement with the fittings 74 to secure the rack 62 to the motorcycle 10. The latches 64 each have a recess with a semi-circular portion 98 that receives the fitting 74 and that abuts the docking surface 86 between the end flanges 84 of the outer sleeve 82 when latched in engagement. The end flanges 84 retain the rack 62 on the fittings 74 and the semi-circular portion 98 in contact with the docking surface 86. Additionally, the semi-circular portion 98 is substantially concentric about the axis 58A of the rear docking points 58 and defines a latching direction in which each of the rear docking points 58 is gripped on two opposing sides. As illustrated in FIG. 7, the latching direction is substantially vertical. Additionally, a latch width 102 is defined in the latching direction.

Figure 8:
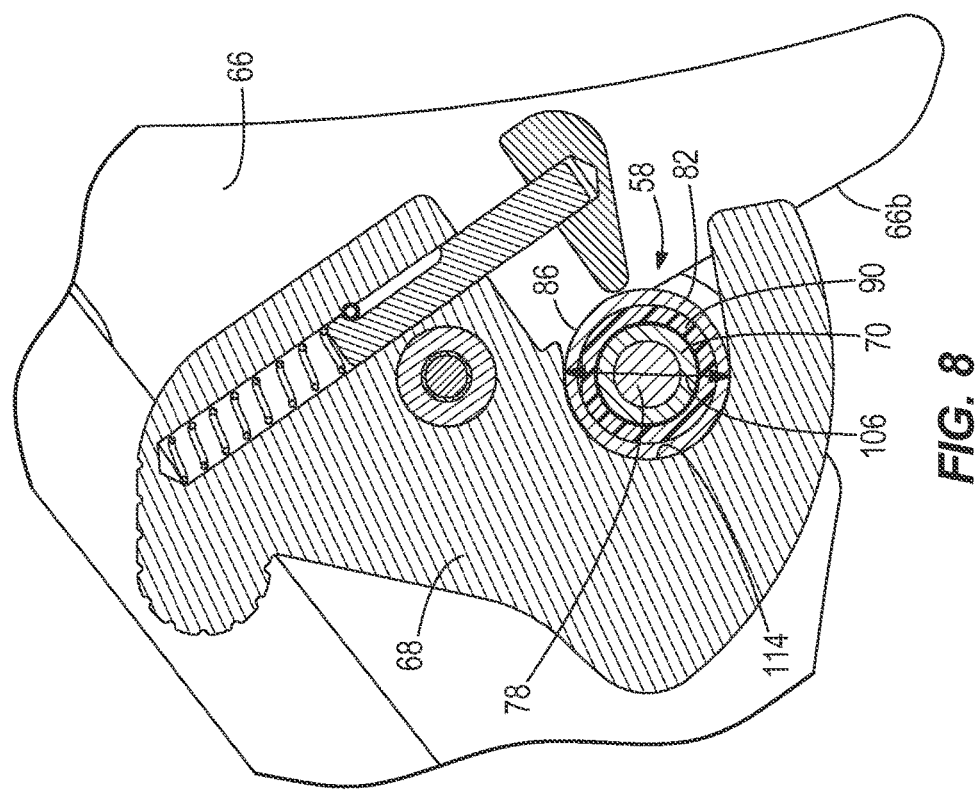
FIG. 8 is a cross-sectional view of a forward docking point taken along line 8-8 of FIG. 2, illustrating a rear mounting slot and a latch of the upright rail receiving the fitting of the forward docking point.
Figure 10:
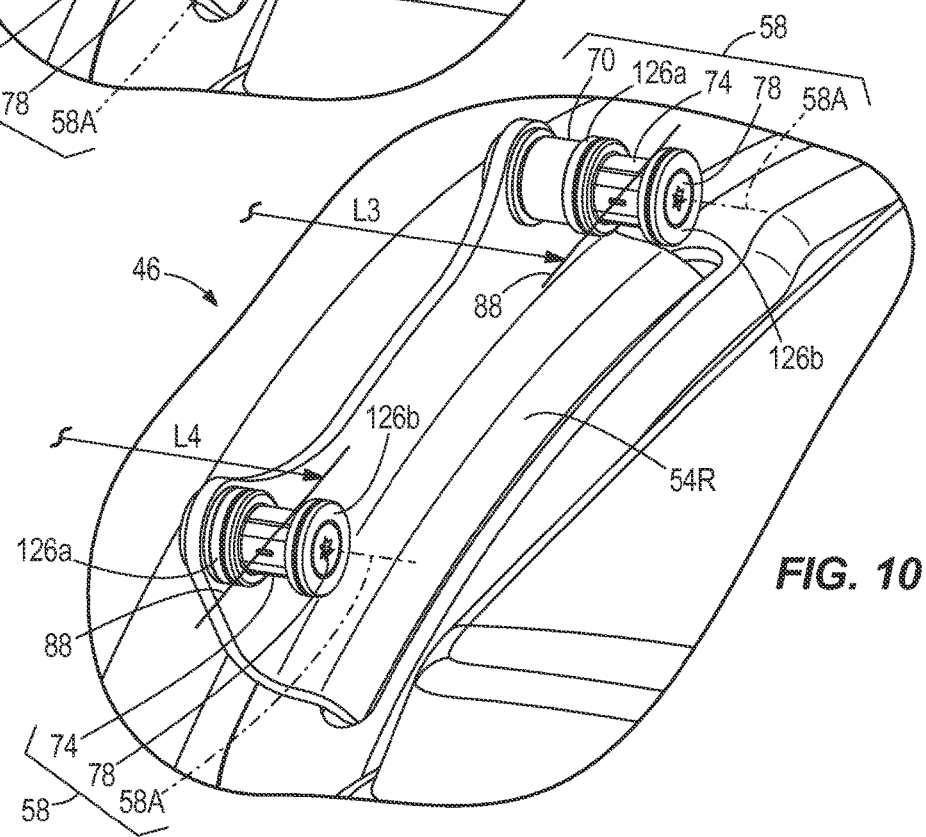
FIG. 10 is a perspective view of the docking points of FIG. 2 with a thicker end flange of the fitting configured to engage a mounting bracket.

With reference to FIGS. 3 and 8, similar to the rack 62, the fixed docking points are positioned forward of the forward docking points 58 on each of the left and right sides of the rear fender 42 (FIG. 10). Alternatively, there may be any number of fixed docking points and corresponding front mounting slots 66a. Additionally, in alternative embodiments the fixed docking points may be replaced with adjustable docking points 58. The upright rail 66 further includes a pair of rear mounting slots 66b each configured to slidingly receive the fitting 74 of one of the forward docking points 58. Similar to the pair of rear mounting slots 62b of the rack 62, each of the rear mounting slots 66b of the upright rail 66 are configured with one of the latches 68 so that once the rear mounting slots 66b slidingly receive the fittings 74, the latches 68 are pivoted into engagement with the fittings 74 to secure the upright rail 66 to the motorcycle 10. The latches 64 each include a recess with a semi-circular portion 114 that receives the fitting 74 and that abuts the docking surface 86 between the end flanges 84 of the outer sleeve 82 when in latched engagement. The end flanges 84 retain the upright rail 66 on the fittings 74 and the semi-circular portion 114 in contact with the docking surface 86. Additionally, the semi-circular portion 114 is substantially concentric about the axis 58A of the forward docking points 58 and defines a latching direction in which each of the forward docking points 58 is gripped on two opposing sides. As illustrated in FIG. 8, the latching direction is substantially vertical. Additionally, a latch width 106 is defined in the latching direction.

In order to attach the rack 62 to the docking points 58 of the accessory support assembly 46, the front mounting slots 62a of the rack 62 slidingly receive the lugs 70 of the forward docking points 58 on both the left and right sides of the motorcycle 10 along the opening direction. Once the pair of front mounting slots 62a are mounted to the forward docking points 58, the rack 62 is pivoted about the forward docking points 58 so that the rear mounting slots 62b slidingly receive the rear docking points 58. The rack 62 is then secured by pivoting the latches 64 into latched engagement with the fittings 74 of the rear docking points 58 (FIG. 7). The upright rail 66 is similarly attached to the accessory support assembly 46. First, the front mounting slots 66a slidingly receive fixed docking points (not shown) on both left and right sides of the rear fender 42. The upright rail 66 is then pivoted about the fixed docking points so that the rear mounting slots 66b of the upright rail 66 slidingly receive the forward docking points 58. The upright rail 66 is then secured by pivoting the latches 68 into engagement with the fittings 74 of the forwarding docking points 58 (FIG. 8).

Referring to FIGS. 7 and 8, in one method of operation, each fitting 74 is originally positioned in a loose configuration. That is, the fittings 74 of each of the forward docking points 58 and the fittings 74 of each of the rear docking points 58 are initially oriented in their loosest configuration, where the minimum diameter C of each docking point 58 is oriented vertically (to coincide with the latching direction). The orientation of the minimum diameter C of the docking surface 86 is illustrated as vertical, but may be in any other orientation depending on the orientation of the latches 64, 68 and corresponding latching directions. In the loose configuration of the fittings 74 of the rear and forward docking points 58 there may be enough clearance in the latching direction between the docking surface 86 and the latches 64 that a secure fit is not formed, thereby causing vibration or rattling of the rack 62 while the motorcycle 10 is in operation. Similarly, in the loose configuration of the fittings 74 of the forward docking points 58 there may be enough clearance between the docking surface 86 and the latches 68 of the upright rail 66 to cause similar issues.

With continued reference to FIGS. 7 and 8, if one of or both of the rack 62 and the upright rail 66 does not form a secure fit when the rear and forward docking points 58 are in the loose configuration, the fittings 74 of each of the rear and forward docking points 58 may each be independently rotated by up to 90 degrees to eliminate any looseness or clearance and to provide a tighter fit between the rear and forward docking points 58, and the corresponding latches 64, 68 of the rack 62 and the upright rail 66. When the maximum diameter D of the docking surface 86 of each docking point 58 is oriented vertically so that the maximum diameter D is in alignment with the latching direction, the tightest fit possible is provided. However, since the diameter of the docking surface 86 increases gradually as the fitting 74 is rotated, a secure, rattle-free fit may be formed before the maximum diameter D is rotated into alignment with the latching direction. The fit between the docking points 58 and the latches 66, 68 may be adjusted as desired, either to eliminate clearance, or further to form a press fit, which can optionally compress the sleeve when latched to provide a tighter fit.

With reference to FIG. 5 the flange 126a on the first axial end of the bushing 90 defines a first thickness T1 that is thicker than a second thickness T2 defined by the flange 126b on the second axial end of the bushing 90. Both thicknesses T1, T2 are measured in the axial direction. The difference in the flange thicknesses T1, T2 corresponds to a difference between a first distance X from the first axial end of the fitting 74 to the center plane 88 of the docking surface 86 and a second distance Y from the second axial end of the fitting 74 to the center plane 88 of the docking surface 86. The fitting 74 can be removed from the lug 70 and re-positioned on the lug 70 so that either flange 126a, 126b engages one of the mounting brackets 54L, 54R. The differing thicknesses T1, T2 permits the user to adjust a lateral distance between the two forward docking points 58, and likewise to adjust a lateral distance between the two rear docking points 58. In the illustrated embodiment, the difference between the thicknesses T1, T2 of the flanges 126a, 126b on each end of the bushing 90 is at least 0.03 inches (e.g., approximately 0.04 inches, 0.05 inches, or 0.06 inches), in the case of 0.06 inches, providing a total lateral adjustment distance of 0.12 inches combined between the pair of forward docking points 58 and likewise between the pair of rear docking points 58. In other embodiments, the difference between the thicknesses of the flanges 126a, 126b may be larger or smaller. By providing the flanges 126a, 126b with different thicknesses, it is possible to adjust the offset of the center plane 88 of the docking surface 86 of at least one of the docking structures 58 relative to the longitudinal axis 30 of the motorcycle 10 so as to accommodate wider or narrower accessories, and to provide a tighter fit along the axis 58A transverse to the longitudinal axis 30.

Figure 9:
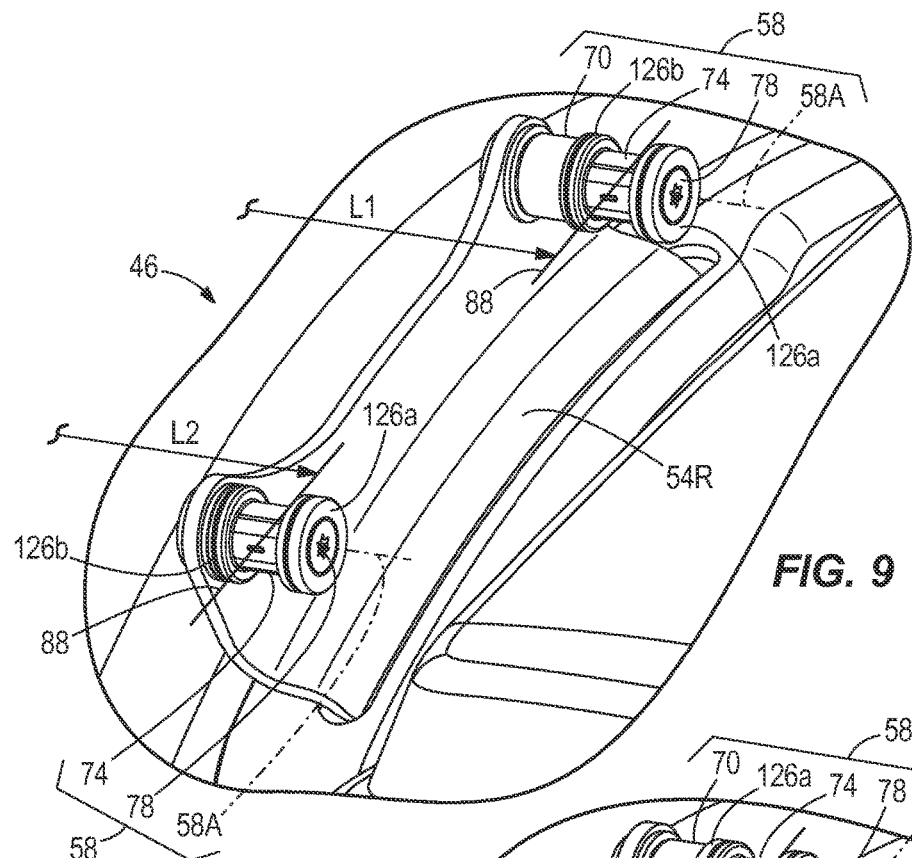
FIG. 9 is a perspective view of the docking points of FIG. 2 with a thinner end flange of the fitting configured to engage a mounting bracket.

As shown in FIG. 9, the thinner flange 126b of each bushing 90 is positioned adjacent the right mounting bracket 54R and the rear fender 42, providing a distance L1 between the center plane 88 of the forward docking point 58 and the longitudinal axis 30 and providing a distance L2 between the center plane 88 of the rear docking point 58 and the longitudinal axis 30. Although not shown, a similar arrangement is provided on the left side of the motorcycle 10. If the detachable accessory being mounted to the forward docking points 58 is wider than twice the distance L1, one or both of the fittings 74 may be removed from the lugs 70 and axially reversed so that the thicker flange 126a of the bushing 90 faces toward the rear fender 42, thereby increasing the distance between the center plane 88 of the forward docking point 58 and the longitudinal axis 30 from L1 to L3 as shown in FIG. 10. This provides a larger total distance between the forward docking points 58 to accommodate a wide accessory and may provide a tighter fit along the axes 58A of the forward docking points 58. A similar adjustment can be made with respect to the rear docking points 58, independent of the adjustment to the forward docking points 58 to adjust the distance between the center plane 88 of the rear docking point 58 and the longitudinal axis 30 from L2 to L4 as shown in FIG. 10 to accommodate wider accessories and provide a tighter fit along the axes 58A of the rear docking points 58. Any or all of the fittings 74 can be reversed independently as needed, and can be switched back-and-forth for various accessories having different widths at their attachment points.

As shown and described, all of the docking points 58 are provided with the fittings 74 to permit adjustment in both a lateral spacing and a latching direction perpendicular to the axes 58A of the docking points 58. In other embodiments, the fittings 74 may incorporate only one type of adjustment or the adjustable fittings 74 may only be provide on selected ones of a plurality of docking points.

Various independent aspects of the invention are set forth in the following claims.

What is claimed is:

1. A motorcycle comprising:
    a frame defining a longitudinal center axis, the motorcycle having left and right sides divided by the longitudinal center axis;
    a rear fender coupled to a rear portion of the frame;
    an accessory support structure positioned laterally adjacent to both left and right sides of the rear fender; and
    a pair of docking structures including a left docking structure positioned on the left side of the longitudinal center axis, and a right docking structure positioned on the right side of the longitudinal center axis, each of the pair of docking structures including
    a lug secured to the frame and extending transverse to the longitudinal center axis, and
        a hollow fitting defining a docking surface with a non-circular cross-section, the fitting being rotationally adjustable about a mutual axis of the lug and the fitting so that the rotational orientation of the docking surface defined by the fitting is adjustable.

2. The motorcycle of claim 1, further comprising at least one accessory releasably engaged with the pair of docking structures to support the accessory adjacent to the rear fender, wherein rotation of the fitting is operable to adjust a fit between each of the pair of docking structures and corresponding mating portions of the at least one accessory.

3. The motorcycle of claim 2, wherein the at least one accessory includes a pair of latches each having a recess that is configured to receive one of the pair of docking structures, wherein the recess is configured to contact the outer surface of the fitting at two opposing points along a latching direction, wherein the non-circular cross-section is an elliptical cross-section having a first diameter and a second diameter, and wherein the fittings of the pair of docking structures are independently rotatable between a first orientation where the first diameter of the elliptical cross-section aligns with the latching direction of the docking slot and a second orientation where the second diameter aligns with the latching direction.

4. The motorcycle of claim 1, wherein the non-circular cross-section of each of the pair of docking structures defines a maximum diameter and a minimum diameter that are spaced approximately 90 degrees apart about the mutual axis of the lug and the fitting.

5. The motorcycle of claim 1, wherein the pair of docking structures is a first, rear pair of docking structures, and the motorcycle further comprises a second, forward pair of docking structures arranged forward of the pair of rear docking structures along the longitudinal axis on left and right sides of the longitudinal axis.

6. The motorcycle of claim 5, further comprising a first accessory and a second accessory, wherein the first accessory releasably engages with the rear pair of docking structures to support the first accessory adjacent the rear fender and includes a pair of latches each defining a recess configured to receive one of the pair of rear docking structures, and the second accessory releasably engages with the forward pair of docking structures to support the second accessory adjacent the rear fender and includes a pair of latches each defining a recess configured to receive one of the pair of forward docking structures.

7. The motorcycle of claim 5, further comprising a rack releasably engaged with the pair of rear docking structures, and an upright rail releasably engaged with the pair of forward docking structures.

8. The motorcycle of claim 1, wherein the docking surface of the fitting of each of the pair of docking structures includes an indicator to indicate a point on the docking surface farthest from the mutual axis of the fitting and the lug.

9. The motorcycle of claim 1, wherein the accessory support structure includes a pair of mounting brackets coupled to the frame and positioned on left and right sides of the longitudinal center axis, wherein each of the pair of docking structures is coupled to one of the pair of mounting brackets, and wherein the pair of docking structures are positioned coaxially with each other.

10. The motorcycle of claim 1, wherein the fitting of at least one of the pair of docking structures has a first end defining a first flange and a second end defining a second flange, the first and second flanges being alternately engageable with the accessory support structure, wherein the first flange has a first thickness and the second flange has a different, second thickness to provide adjustment of a lateral offset of the at least one docking structure relative to the longitudinal center axis.

11. A motorcycle comprising:
    a frame defining a longitudinal center axis, the motorcycle having left and right sides divided by the longitudinal center axis;
    a rear fender coupled to a rear portion of the frame;
    an accessory support structure positioned laterally adjacent to both left and right sides of the rear fender; and
    a pair of docking structures including a left docking structure positioned on the left side of the longitudinal center axis, and a right docking structure positioned on the right side of the longitudinal center axis, each of the pair of docking structures including
        a lug secured to the frame and extending transverse to the longitudinal center axis, and
        a hollow fitting positionable on the lug, the fitting having a first end defining a first flange, a second end defining a second flange, and a docking surface between the first and second ends, the fitting being removable from the lug and repositionable so that either the first flange or the second flange engages the accessory support structure,
        wherein, in at least one of the pair of docking structures, the first flange has a first thickness and the second flange has a different, second thickness so that a lateral dimension from the longitudinal center axis to a center of the docking surface is adjusted depending on which of the first and second flanges is engaged with the accessory support structure, wherein a position of the docking surface when the first flange engages with the accessory support structure overlaps with a position of the docking surface when the second flange engages with the accessory support structure.

12. The motorcycle of claim 11, further comprising at least one accessory releasably engaged with the pair of docking structures to support the accessory adjacent to the rear fender.

13. The motorcycle of claim 12, wherein the pair of docking structures is a first, rear pair of docking structures, and the motorcycle further comprises a second, forward pair of docking structures positioned forward of the rear pair of docking structures, and wherein the rear pair of docking structures supports a first accessory and the second pair of docking structures supports a second accessory.

14. The motorcycle of claim 12, wherein the docking surface of at least one of the pair of docking structures has a non-circular cross-section so as to adjust a fit between the at least one of the pair of docking structures and the at least one detachable accessory in response to reorientation of the fitting on the lug.

15. The motorcycle of claim 11, wherein each of the pair of docking structures has a center equidistant between the first flange and the second flange, wherein a distance is defined between the centers of the pair of docking structures, wherein the distance is larger when the first flange of the fitting of the at least one of the pair of docking structures engages the accessory support structure as compared to the distance when the second flange of the fitting of the at least one of the pair of docking structures engages the accessory support structure.

16. The motorcycle of claim 11, wherein the pair of docking structures are positioned coaxially with each other.

17. The motorcycle of claim 11, wherein the docking surface of at least one of the pair of docking structures has an elliptical cross-section, and wherein the fitting is rotatable about a mutual axis of the lug and the fitting.

18. An accessory support assembly for a motorcycle, the accessory support assembly comprising:

an accessory support structure configured for attachment to the motorcycle and being bisected by a longitudinal center axis to define left and right portions; and a pair of docking structures including a left docking structure coupled to the left portion of the accessory support structure, and a right docking structure coupled to the right portion of the accessory support structure, each of the pair of docking structures including
- a lug secured to the frame and extending transverse to the longitudinal center axis, and
- a hollow fitting positionable on the lug and rotatable thereon, the fitting having a first end, a second end, and a docking surface between the first and second ends, wherein an outer surface of the docking surface is provided with a non-circular cross-section for altering a fit provided by the docking surface in response to rotation of the fitting on the lug, and wherein a lateral dimension from the longitudinal center axis to a center of the docking surface is adjusted depending on which of the first and second ends of the fitting faces toward the longitudinal center axis when positioned on the lug.

19. The accessory support assembly of claim 18, wherein the pair of docking structures is a first, rear pair of docking structures, and the accessory support assembly further comprises a second, forward pair of docking structures, positioned forward of the rear pair, including a left docking structure coupled to the left portion of the accessory support structure, and a right docking structure coupled to the right portion of the accessory support structure.

20. The accessory support assembly of claim 18, wherein the cross-section of the docking surface is elliptical, and wherein the first and second ends of the fitting are provided with flanges of different thickness.

* * * * *